W. RUTHERFORD.
Compound Protractor.
No. 69,844. Patented Oct. 15, 1867.
Fig. 2.
Fig. 1.
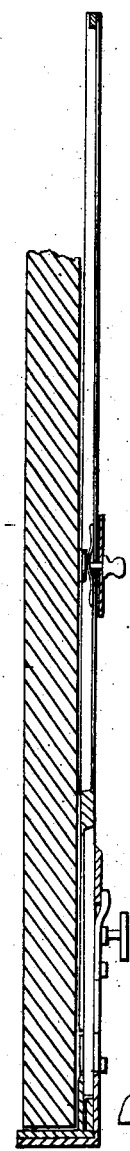
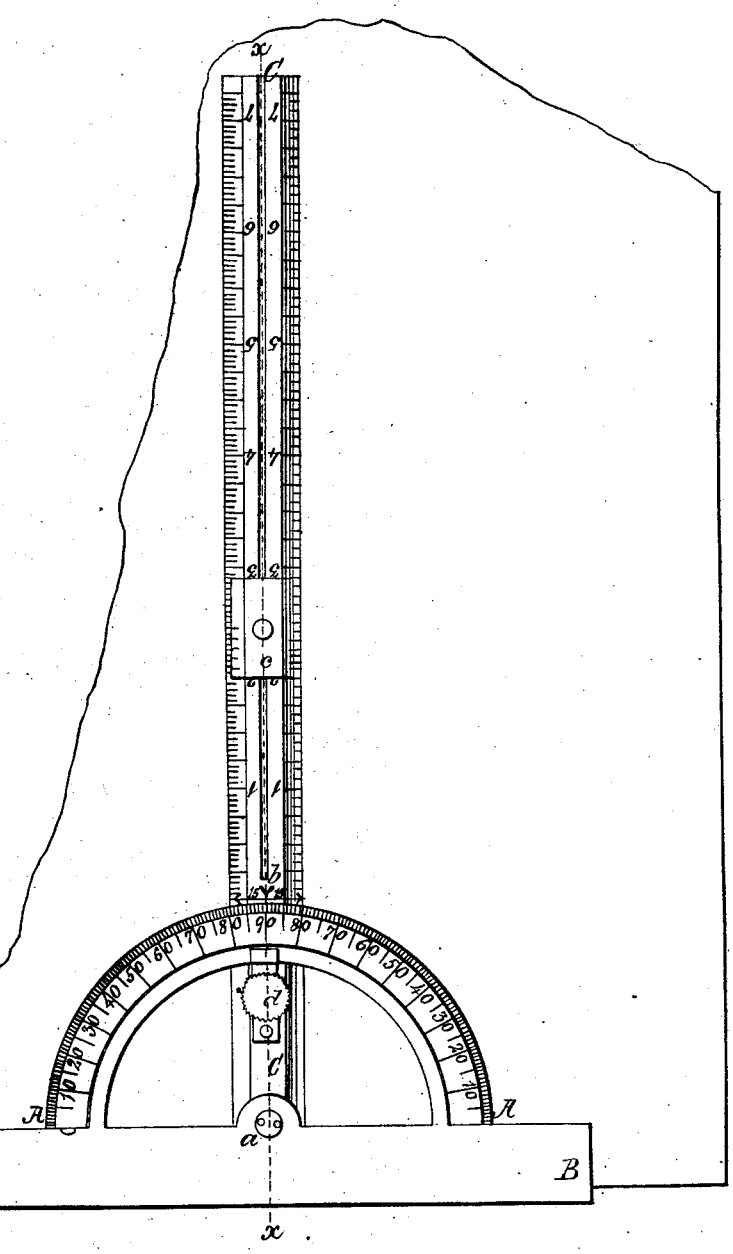
Witnesses
Inventor

United States Patent Office.

WILLIAMS RUTHERFORD, OF ATHENS, GEORGIA.

Letters Patent No. 69,844, dated October 15, 1867.

---

IMPROVEMENT IN COMPOUND PROTRACTORS.

---

*The Schedule referred to in these Letters Patent and making part of the same.*

---

TO ALL WHOM IT MAY CONCERN:

Be it known that I, WILLIAMS RUTHERFORD, of Athens, in the county of Clark, and State of Georgia, have invented a new and useful Improvement in Mathematical Instruments; and I do hereby declare that the following is a full, clear, and exact description thereof, which will enable others skilled in the art to make and use the same, reference being had to the accompanying drawings, forming part of this specification, in which—

Figure 1 is a plan of the instrument.

Figure 2 is a section taken in the line $x\,x$.

Similar letters of reference indicate like parts.

This invention relates to an improved mathematical instrument for the use of civil engineers, surveyors, navigators, architects, and draughtsmen generally in plotting surveys from field-notes, the traverse or rhumb-line of sailing vessels, laying down plans of buildings, &c., with great facility and accuracy.

This instrument consists in the combination of an ordinary graduated semicircle or simple protractor, with a graduated rule or scale of measurement, so formed and connected that in conjunction with a perfectly rectangular drawing-board or table the work of plotting may be performed directly from the field-notes without the aid of any other mathematical instrument. By laying the instrument on the rectangular drawing-board, with its base against the side, a meridian line is established, and any desired angle of a course is determined by a vernier on the scale-rule pointing to the notation on the protractor, and transferred or transported directly to any point of a plot or diagram on the drawing-paper, from which point the distance on the course or line to be measured may be accurately set off on the edge of the graduated rule or scale. By the repetition of this operation on all the required courses and distances, the plotting is continued until complete without the employment of dividers or independent scales of measurement. The instrument may be shifted from the meridian or base line of the drawing-board to its adjacent side, when, by setting the pivoted rule to the complementary angle on the opposite side of the protractor, the plot may be extended to any and every part of the board; or without altering the angle of the rule, and shifting the instrument in the same manner to an adjacent side, a right angle to the last line may be erected with facility and accuracy.

For ordinary use the instrument will be about three feet in length of the rule and corresponding radius of the semicircle, but it may be made of any required size, the dimensions being limited only by the requirements of its practical application. The graduation of the protractor may be made in any desired divisions or minute fractions of degrees, and the scale of the rule divided into any desired fractions of an inch or other unit of measurement.

Large instruments for coast surveys or other extended plotting, with rules and protractors six or more feet in length, may have the scale of equal parts divided into the one hundredth parts of an inch, and thus the distances on a course be set off with the most perfect accuracy.

A A is the graduated semicircle or protractor, divided in the ordinary way into degrees and parts of a degree. B B is a solid metal base, attached to the protractor in the line of its diameter, and projecting at right angles to the plane thereof, to slide along the edge or side of the drawing-board, considered as a meridian line, and thereby obviating the necessity for using parallel rules or any device for drawing parallel meridian lines on the plot. C is the graduated rule or scale of measurement, divided into inches and parts of an inch, and pivoted in the centre of the protractor at $a$, so that it shall slide back and forth on the under side over the whole scale of the semicircle. $b$ is a vernier, marked on or attached to the rule C in the central longitudinal line thereof, for pointing off an angle on the protractor. $c$ is a sliding graduated vernier on the scale-rule C to traverse in a central longitudinal slot, and secured by a set-screw and guide-spring on the under side, which vernier may not be used, but is intended for minute measurements; and $d$ is a small clamp, secured by a set-screw for temporarily fastening the rule to the protractor at any angle designated by the vernier $b$ to be transferred to the plot. For the use of navigators to plot the traverse or rhumb-line of sailing vessels, the rhumbs or points of the compass will be marked on the verge of the protractor. This instrument will render the work easy, and insure accuracy without regard to the rolling of the ship.

Having fully described the construction and uses of my improved compound protractor and scale-rule, what I claim as new, and desire to secure by Letters Patent, is—

1. I claim the solid base B, projecting at right angles to the plane of the graduated semicircle, so as to slide along the edge of the drawing-board, considered as a meridian line, in combination therewith and with the graduated rule, constructed as herein described.

2. I claim also the fixed vernier $b$ and the sliding vernier $c$, in combination with the scale-rule C and the protractor A, arranged and applied as and for the purposes herein specified.

The above specification of my invention signed by me this       day of       1866.

WILLIAMS RUTHERFORD.

Witnesses:
JAS. T. SANSOM,
JAS. D. PITTARD.